United States Patent
Gronbach

(10) Patent No.: US 10,118,267 B2
(45) Date of Patent: Nov. 6, 2018

(54) MACHINE TOOL WITH A MACHINE RACK CONSTRUCTED OF STRUCTURAL PARTS

(71) Applicant: DECKEL MAHO Pfronten GmbH, Pfronten (DE)

(72) Inventor: Hans Gronbach, Eisenberg (DE)

(73) Assignee: Deckel Maho Pfronten GmbH, Pfronten (DE)

( * ) Notice: Subject to any disclaimer, the term of this patent is extended or adjusted under 35 U.S.C. 154(b) by 558 days.

(21) Appl. No.: 14/624,034

(22) Filed: Feb. 17, 2015

(65) Prior Publication Data
US 2015/0231750 A1   Aug. 20, 2015

(30) Foreign Application Priority Data
Feb. 17, 2014 (DE) .......................... 10 2014 202 879

(51) Int. Cl.
*B23Q 11/12* (2006.01)
(52) U.S. Cl.
CPC .................. *B23Q 11/128* (2013.01)
(58) Field of Classification Search
CPC ........ B23Q 11/128; B23Q 11/148; B60H 1/00
USPC ........................................ 165/288, 289, 294
See application file for complete search history.

(56) References Cited

U.S. PATENT DOCUMENTS

| | | | |
|---|---|---|---|
| 2,221,127 A * | 11/1940 | Bates | B23F 23/12 165/206 |
| 5,186,394 A | 2/1993 | Tsuji | |
| 5,495,721 A * | 3/1996 | Stueble | D01H 1/16 62/121 |
| 6,089,797 A * | 7/2000 | Chen | B23Q 11/141 165/206 |
| 7,185,503 B2 * | 3/2007 | Parpajola | B23Q 11/128 409/135 |
| 9,233,442 B2 | 1/2016 | Tullmann et al. | |

FOREIGN PATENT DOCUMENTS

| | | |
|---|---|---|
| DE | 2143143 A1 | 1/1973 |
| DE | 4132822 A1 | 4/1992 |
| DE | 19846260 A1 | 4/2000 |

(Continued)

OTHER PUBLICATIONS

German Office Action for DE Application No. 10 2014 20 879.5 dated Feb. 11, 2015 (9 pages with partial English translations of the main parts of communications).

(Continued)

*Primary Examiner* — Raheena R Malik
(74) *Attorney, Agent, or Firm* — Eversheds Sutherland (US) LLP

(57) ABSTRACT

Provided is a machine tool with a machine rack constructed of structural parts and components mounted thereon, the components including functional components. The functional components generate heat during the operation of the machine tool which is input into the structural parts and/or the components by heat transport. The machine tool may also include a flow channel system disposed on the structural parts and/or the components of the machine tool in which a tempering medium is circulated such that the heat generated by the functional components is distributed in the machine rack and/or the components as a result of the passage of the tempering medium.

20 Claims, 20 Drawing Sheets

(56) References Cited

FOREIGN PATENT DOCUMENTS

| | | |
|---|---|---|
| DE | 202009009424 U1 | 11/2010 |
| DE | 1020111104892 A1 | 12/2012 |
| EP | 0355730 A2 | 2/1990 |
| EP | 2561955 A1 | 2/2013 |
| JP | S61214929 A | 9/1986 |
| JP | 2005262379 A | 9/2005 |
| WO | 2008010309 A1 | 1/2008 |
| WO | 2012/032423 A1 | 3/2012 |

OTHER PUBLICATIONS

European Office Action for EP Application No. EP15155266.8 dated Jul. 15, 2015 (8 pages with partial English translations of the main parts of communications).

\* cited by examiner

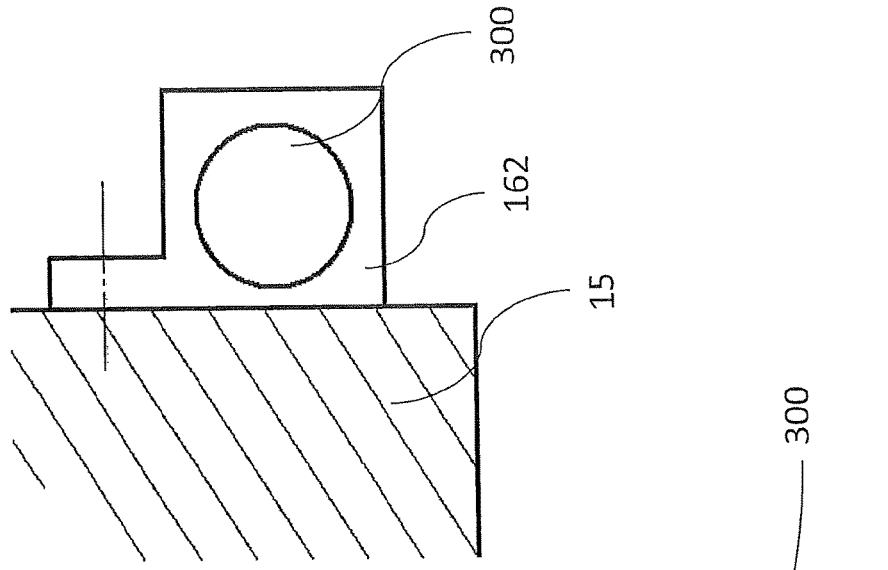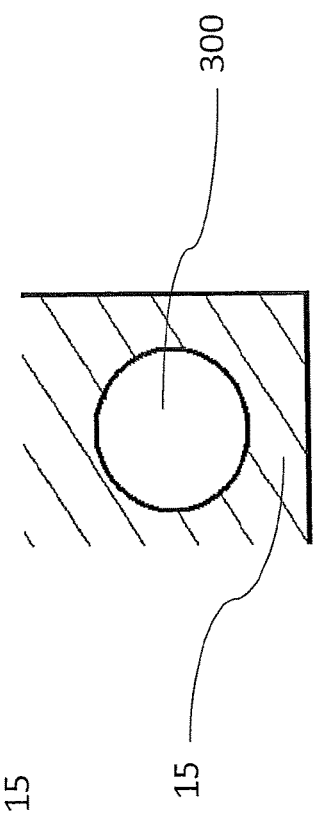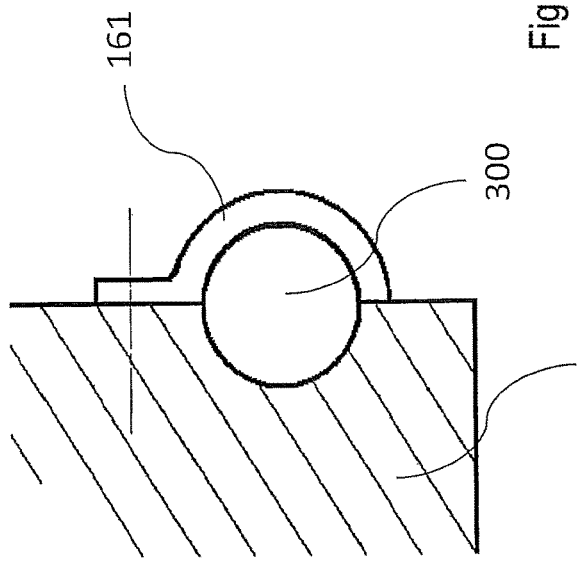

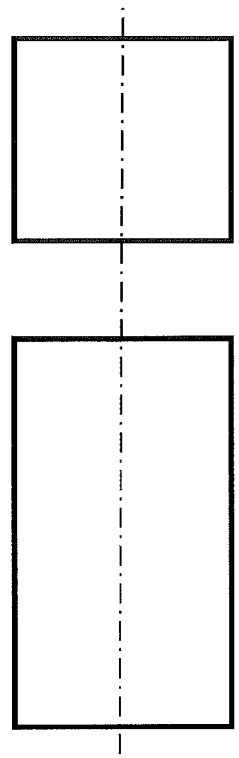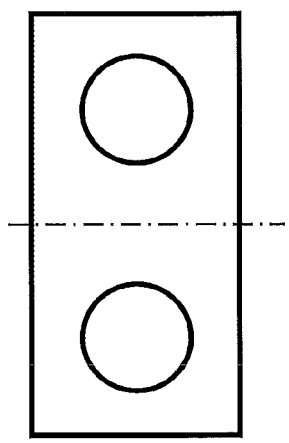
Fig. 11

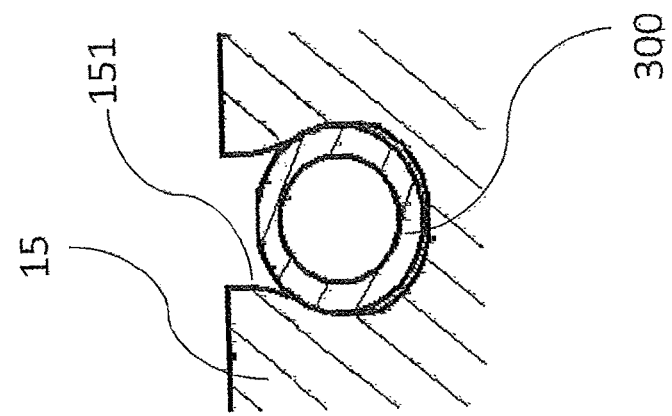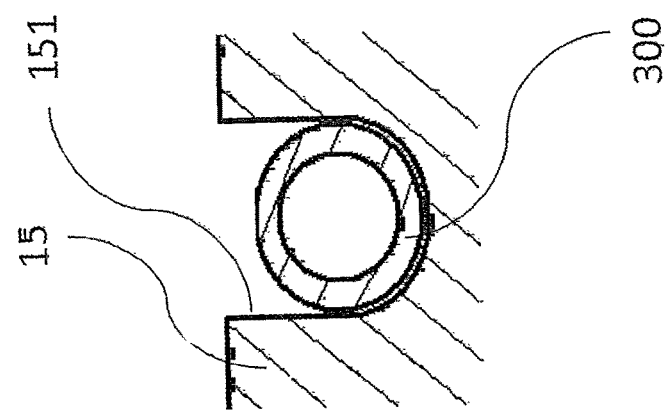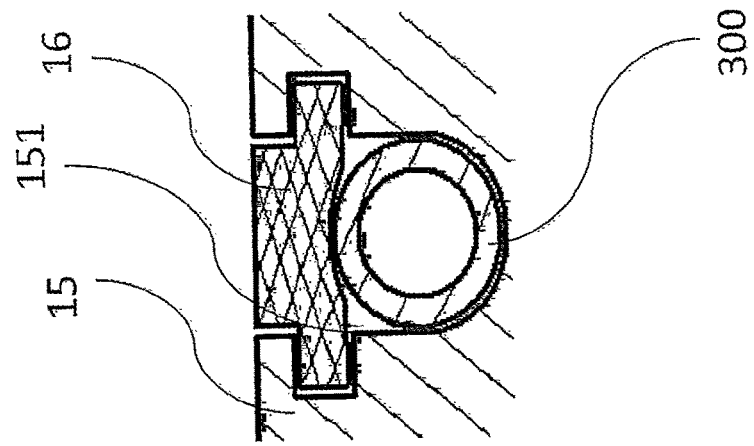

MACHINE TOOL WITH A MACHINE RACK CONSTRUCTED OF STRUCTURAL PARTS

CROSS-REFERENCE TO RELATED APPLICATIONS

This application claims priority to German Application No. 102014202879.5 filed Feb. 17, 2014, the entire contents of which is incorporated by reference herewith.

FIELD OF INVENTION

Embodiments of the present invention relate to a machine tool with a machine rack constructed of structural parts and components mounted thereon, including functional components that generate heat during operation of the machine tool. Therein, temperature-related deformations of the structural parts of the machine tool are reduced with the aid of a flow channel system.

BACKGROUND

From prior art, various devices and methods for reducing temperature-related deformations of a machine tool are known. From DE 41 32 822 A1, for example, cooling with a spray nozzle is known. Therein, coolant is sprayed to preset locations of the machine tool via a freely pivotable spray nozzle to cool these locations.

From WO 2012/032423 A1, a machine with a compensation mechanism is known. Therein, the deformation of the machine is determined via detection devices, and subsequently, compensation for the determined deviations is performed via the correction device. Thus, only compensation for the deformations occurs without cooling of the machine tool.

The above-mentioned temperature-related deformations of conventional machine tools are exemplarily illustrated in FIG. 1. The machine tool illustrated in FIG. 1 is composed of a machine bed (500), a post (900), a machine table (501), and a spindle (901). The machine bed (500) is connected to the machine table (501) via guides, and the post (900) receiving a spindle (901) is fixed to the machine bed (500). In the operation of the machine tool, the areas in which the heat generating functional components such as the spindle (901) or guides are disposed are comparatively severely heated. This one-sided heating of the structural components of the machine tool results in a non-uniform deformations or deflections of the structural components of the machine tool. Due to these deflections, the processing axes of the machine tool also displace. Such a non-uniformly heated machine tool is shown in the right-hand illustration in FIG. 1. Here, the spindle processing axis deforms by the angle cc and the processing axis of the machine table (501) is deformed by the angle β. In the illustrated machine tool, these deformations, in particular, result from the different temperatures on the upper side and the lower side of the machine bed (500). The temperature on the lower side of the machine bed (503) is less than the temperature on the upper side of the machine bed (502) in the illustrated example. Due to these different temperatures, the different sides of the machine bed (500) differently expand. The upper side of the machine bed (502) expands further than the lower side of the machine bed, since the temperature on the lower side of the machine bed (503) is lower than on the upper side of the machine bed (502). Since both the post (900) and the machine table (501) are attached to the machine bed (500), and this machine bed (500) now deforms or curves during operation, the different variations of the processing axes result. The illustrated deflecting and curving effects are the greater the longer the machine bed (500) is and the greater the temperature differences on it are.

SUMMARY OF THE INVENTION

An object of the present invention is to compensate, as inexpensively and effectively as possible, for the temperature-related variations discussed above of conventional machine tools. In particular, the temperature-related curvatures and bends of the machine tool are to be reduced.

The above object may be solved by a machine tool as described herein by way of advantageous embodiments of the invention.

The machine tool with a machine rack constructed of structural parts and components mounted thereon includes functional components generating heat during operation of the machine tool. Therein, the heat can be input into the structural parts and/or the components by heat transport. The machine tool may comprise a flow channel system, in which a tempering medium can be circulated, that may be disposed on the structural parts and/or the components of the machine tool such that the heat generated by the functional components can be distributed in the machine rack and/or the components as a result of passage of the tempering medium.

By the uniform distribution of the input heat in the concerned structural part of the machine tool, the temperature differences in the structural components, and thus also the respective deflections of the structural parts, can be reduced.

By the flow channel system described in certain embodiments herein, cooling of the machine tool does not occur, but rather equalization of the different temperatures of the various areas of the structural components of the machine tool. As a result of the uniform temperature in the machine rack and in the further structural parts of the machine tool, uniform temperature-related expansion that avoids deflections of the structural parts and components of the machine tool is possible.

Unlike in the known principle of cooling the machine tool, in which the cooling channels are immediately and exclusively disposed at the heat generating functional components for dissipating the input heat from the machine rack to the environment or in a refrigerating machine, certain embodiments of the invention include channels that are provided both in the areas with heat generators and in the areas without heat generators. By this form of the arrangement of the channels, it is possible to lower the temperature gradient in the structural component of the machine tool, thus reducing occurrence of deflections and at the same time refraining from a refrigerating machine for heat dissipation.

In other words, according to embodiments of the invention, it is not a matter of cooling the heated structural components anymore, but rather that the developed heat is uniformly distributed in the component via the flow channel system according. Therefore, cooling is not crucial since displacements/shifts generally can be compensated for with control-related compensations, as referenced above with respect to the prior art, while deflections on the machine tool and the above-referenced angular errors resulting therefrom generally cannot be compensated for via the principle of cooling. In certain embodiments, the invention is based on the observation that components do not deflect under the influence of thermal load if heat is dissipated at the place of origin and the components are uniformly tempered throughout their installation space. Therein, according to embodiments of the invention, it is important that all of the channels of the flow channel system are passed by the equally tempered medium that is preferably conveyed by means of a pump.

In certain embodiments, the flow channel system can be disposed on the structural parts and/or components of the machine tool such that tilts and/or displacements of the structural parts and/or components can be prevented. In particular, parts of the flow channel system may be attached to the warm locations of the structural parts and/or components and further parts thereof spaced in cold regions, such that heat equalization can occur and the machine tool can be tempered. In this manner, the processing accuracy of the machine tool can be increased since non-uniform expansion is avoided.

The tempering medium can be circulated via a pump, and therein, all of the flow channels of the flow channel system can be passed. Thereby, particularly efficient tempering of the structural parts and/or components is ensured. A refrigerating machine for tempering is therefore not required since tempering is possible via the adjustment of the power of the pump depending on the generated heat of the functional components.

In certain embodiments, flow channels of the flow channel system of the machine tool can be disposed on the surface of the structural parts and/or components of the machine tool as hollow profiles. By the arrangement of the hollow profiles directly on the surface of the components of the machine tool, simple configuration of the machine tool according to the invention is possible on the one hand, and on the other hand it is also possible to retrofit the flow channels described herein to conventional machine tools. The use of hollow profiles as flow channels additionally presents an inexpensive and effective alternative to expensively produced integrated flow channels in cast parts.

The flow channels of the flow channel system can be configured as cooling profiles, wherein each cooling profile can include at least a feed channel and a return channel for receiving the tempering medium. By providing cooling profiles that have both a feed channel and a return channel at the same time, it is possible to completely temper an entire edge of the machine tool with the attachment of only one single profile. In addition, the openings of the feed channel and of the return channel may be provided at the same location of the cooling profile such that a very simple connection to the cooling system becomes possible. In addition, these cooling profiles can be prefabricated and be cut to the desired length as needed such that inexpensive manufacture of the flow channel system is ensured.

In certain embodiments, the feed channel of the cooling profile may be connected to the return channel in a conducting manner such that the tempering medium can be redirected. By this particular configuration, a circulating circuit or flow channel system may already have been formed using a single cooling profile. Thereby, the cost and also the complexity of the machine tool with the flow channel system as described herein can be reduced.

In certain embodiments, the feed channel may be connected to the return channel via a welded plate with milled track for redirecting the feed into the return. Thereby, it is possible to inexpensively connect the feed channel to the return channel without forming a great flow resistance in the flow channels.

In certain embodiments, the cooling profiles can be screwed to the structural parts and/or components of the machine tool. By attaching the cooling profiles by means of screw connections, a good connection between the side surfaces of the cooling profiles and the structural parts and/or components of the machine tool is ensured on the one hand, and a screw connection allows subsequent disassembly of the cooling profiles on the other hand. Thus, if over the course of time wear occurs in a cooling profile, it can simply be unscrewed and replaced.

Flow channels of the flow channel system of the machine tool described herein may be configured as pipes and be attached in the grooves of the structural parts and/or components of the machine tool. In such embodiments, it is possible to attach the flow channels to the machine tool as space-saving as possible and thus also to temper surfaces and edges of the machine tool that have only a narrow installation space.

In embodiments, pipes of the flow channels of the flow channel system may be fixed in the grooves via fixing lids. With the aid of such fixing lids, the pipes may be simply fixed in the grooves or pressure may be exerted on the pipes via the fixing lids to ensure a complete contact area of the pipes to the structural part and/or component of the machine tool and thus to also optimize the heat transfer.

In certain embodiments, pipes of the flow channels of the flow channel system may be made of, for example, copper. By the particularly advantageous characteristics of the high thermal conductivity of copper, the heat equalization in the machine tool can be further accelerated. Thus, by using copper, the temperature gradient in the machine tool may be further reduced.

The flow channels of the flow channel system according to embodiments may also be configured as bores in the components and/or structural parts of the machine tool. Thereby, it is possible to circulate the tempering medium in immediate vicinity of the heat generating functional components and thus to ensure improved tempering of the machine tool.

The flow channels of the flow channel system according to embodiments may be disposed in the spindle core and in the spindle bearing at the same time. Thereby, the high heat input into the machine tool occurring in the spindle core and in the spindle bearing can already be dissipated at the place of origin. In addition, deformations and curvatures of the sensitive spindle can be particularly reduced.

The machine tool according to embodiments of the invention may include a machine bed and a machine post. The flow channels of the flow channel system of the machine tool may be disposed on an upper side and a lower side along edges of the machine bed and on an upper side and a lower side along edges of the post. This advantageous arrangement of the flow channels along the upper sides and the lower sides effects a particularly effective temperature equalization, since temperature gradients particularly in the machine bed and the post, which belong to the largest structural parts of the machine tool, significantly affect the deflection of the machine tool. In addition, the machine bed and the post have large surfaces for attachment of the flow channels thereon such that they can be installed thereon in an inexpensive and simple manner.

The machine tool can have a pump for regulating the volume flow of the tempering medium. The pump can be set such that the amount of the temperature difference of the tempering medium in the various areas of the flow channel system can be limited to maximally 3° C. and preferably to maximally 1° C. Thus, the volume flow in the flow channels can be regulated via the power of the pump. The heat transport can be controlled via the volume flow and in further consequence the differential temperature in the flow channel system can thus be adjusted. The curvatures and deflections of various machine tool structures can particularly well be reduced if the amount of the differential temperature of the tempering medium in the various areas of the flow channel system is below 3 degrees Celsius (or is maximally 3° Celsius) or preferably below 1 degree Celsius (or maximally 1° C.). Thus, a particular curvature-free and low-deflection structure can be ensured by limiting the temperature difference. The limitation of the temperature difference additionally results in a severe reduction of deformations of the cooling channels which positively affects the tightness of the cooling channel system among other things.

The machine tool additionally can include a first temperature sensor in the area of the functional components and at least a second temperature sensor in an area without functional components for sensing a temperature gradient. By determining a temperature gradient via two temperature sensors, an efficient and simple regulation of the volume flow of the tempering medium can be performed. In some embodiments, temperature sensors may preferably be attached at the heat generating functional components on the one hand and in the cold areas of the machine tool on the other hand, such that the maximum temperature and the minimum temperature in the flow channel system can be determined. Thereby, very efficient regulation of the volume flow can be formed.

A machine tool according to embodiments of the invention may additionally include a regulation and control unit. This unit may be set such that the volume flow of the tempering medium can be regulated via the power of the pump, such that the amount of the differential temperature between the first and the second temperature sensors can be limited to maximally 3° C. and preferably to maximally 1° C. The regulation of the volume flow based on the differential temperature presents a simple and inexpensive possibility of limiting the maximally occurring curvatures and deflections of the respective structural parts of the machine tool.

Embodiments of the invention also provide for method for tempering a machine tool with flow channels that are able to form a flow channel system in which a tempering medium is circulated, that may comprise: equalizing the temperature gradient in the machine tool exclusively by circulating the tempering medium in the flow channels or in the flow channel system. By equalizing the temperature gradient in the machine tool exclusively by circulating the tempering medium in the flow channel system, it is possible to reduce the bends of the structural components of the machine tool without using a refrigerating machine therein. Thus, the cost and the complexity of the tempered machine tool are reduced with tempering according to the method according to the invention.

In certain embodiments, the method is for tempering a machine tool that can have first areas, in which functional components may be disposed, and second areas that may be spaced from the first areas, wherein the heat input into the second areas generated by functional components may be less than into the first areas, and wherein the machine tool may include a post (900) and a machine bed (500). The flow channel system may additionally have first and second flow channels. In some embodiments, the method may include the following steps of: circulating the tempering medium from the first flow channels of the machine bed into the second flow channels of the machine bed; circulating the tempering medium from the second flow channels of the machine bed into the first flow channels of the post; circulating the tempering medium from the first flow channels of the post into the second flow channels of the post; and circulating the tempering medium from the second flow channels of the post into the first flow channels of the machine bed. By circulating the tempering medium between the flow channels of the post and the machine bed, it is possible to equalize the temperature of the post and the machine bed with respect to each other. Thereby, further curvatures of the machine tool rack are reduced.

The method for tempering a machine tool, wherein the machine tool may have first areas, in which functional components can be disposed, and second areas that may be spaced from the first areas, wherein the heat input into the second areas generated by the functional components may be less than into the first areas, and wherein the machine tool may include a post (900) and a machine bed (500). The flow channel system may additionally have first and second flow channels. The method may include the following steps of: circulating the tempering medium from the first flow channels of the machine bed into the first flow channels of the post; circulating the tempering medium from the first flow channels of the post into the second flow channels of the post and/or the machine bed and back. By the connection of the flow channels of the post to the flow channels of the machine bed, it is ensured that even in the case, in which only a part of the heat generating functional components is operated, a temperature gradient as low as possible can be achieved in the entire structure of the machine tool.

The method for tempering a machine tool may additionally include a step of regulating the volume flow of the tempering medium in the flow channels via a pump. Therein, the volume flow may be regulated such that the amount of the differential temperature of the tempering medium in the various areas of the flow channel system can be maximally 3° C. and preferably 1° C. The curvatures and deflections of various machine tool structures can be particularly well reduced if the amount of the differential temperature of the tempering medium in the various areas of the flow channel system is below 3 degrees Celsius (or maximally 3° C.) or preferably below 1 degree Celsius (or maximally 1° C.). Thus, by the limitation of the temperature difference, a particularly curvature-free and low-deflection structure can be ensured. The limitation of the temperature difference additionally results in severe reduction of the deformations of the cooling channels which positively affects the tightness of the cooling channel system, among other things.

BRIEF DESCRIPTION OF THE DRAWINGS

FIG. 3A shows a cooling profile in the groove of a basic element according to an embodiment of the invention.

FIG. 3B shows a cooling profile in a fixing piece connected to the basic element according to an embodiment of the invention.

FIG. 3C shows a cooling profile in a bore in the basic element according to an embodiment of the invention.

FIG. 11 shows exemplary dimensions of a cooling profile with feed and return according to an embodiment of the invention.

FIG. 13A shows a basic element with a milled recess and a cooling profile contained therein which is fixed via a fixing lid according to an embodiment of the invention.

FIG. 13B shows a cooling profile which is clamped in a recess in the basic element according to an embodiment of the invention.

FIG. 13C shows a cooling profile which is clipped in a specially shaped groove in the basic element according to an embodiment of the invention.

DETAILED DESCRIPTION

The temperature response of machine tools results from the variations of the individual structural components of the machine upon variation of the heat balance by internal or external heat sources or also heat sinks. The occurring displacements and shifts can be compensated for with control-related compensation. However, the deflections or the angular errors resulting from them cannot be compensated for. Additionally, compensations are often not possible if displacements and tilts cannot be separated. An object of the present invention is therefore to prevent the tilt of the machine structure as well as to compensate for and also prevent displacements, respectively.

Structural parts do not deflect under the influence of thermal load if the heat is dissipated at the place of origin and the components are uniformly tempered throughout their installation space. Precisely, the invention provides to cause the flow of a tempering medium along the edges and optionally additionally on the surfaces of structural parts and/or components of the machine tool. The medium can optionally be cooled or heated such that the displacement or shift can additionally be controlled. However, it is important that all of the tempering lines or flow channels are passed by the tempered medium which is conveyed by means of pump.

Figure 1:
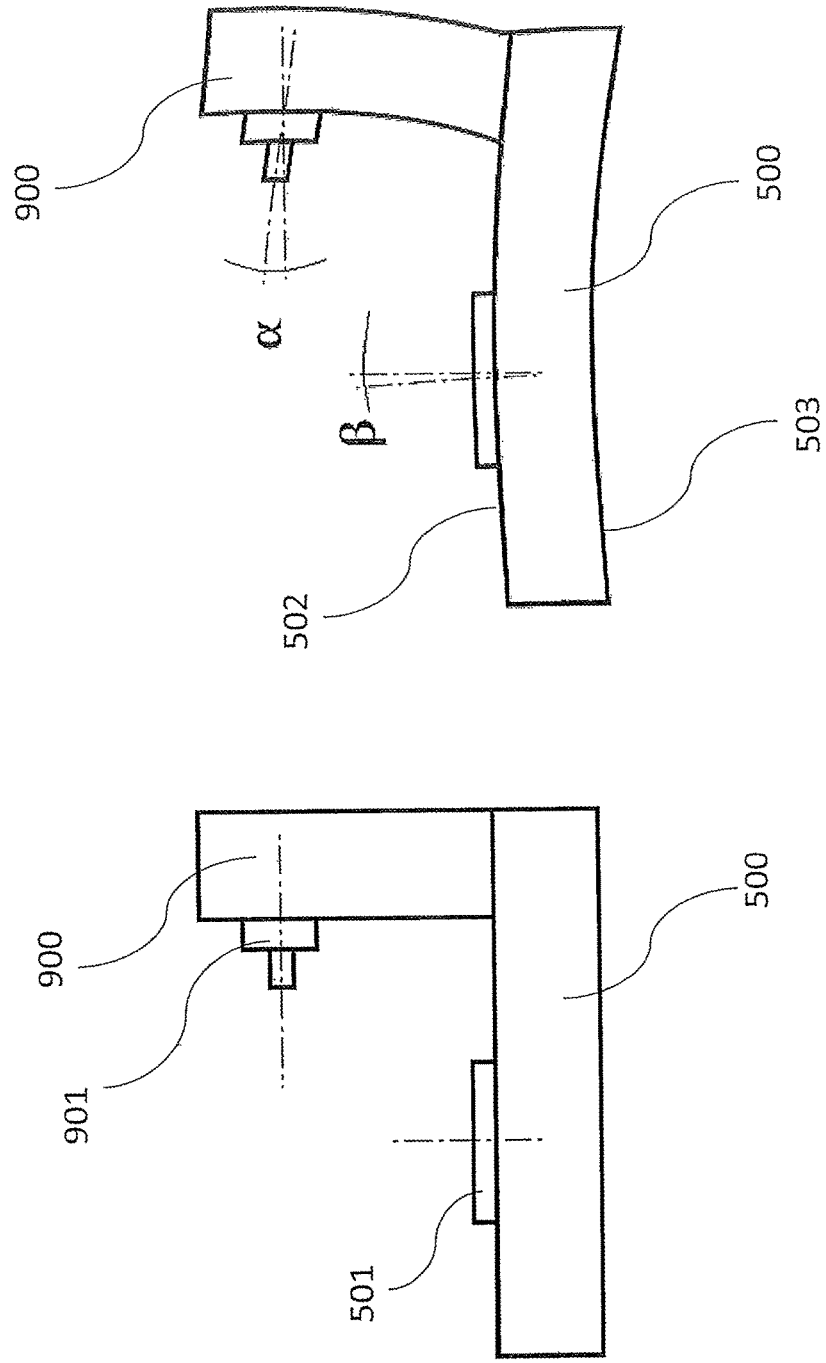
FIG. 1 shows a conventional machine tool in an initial state and in a deformed state.
Figure 2:
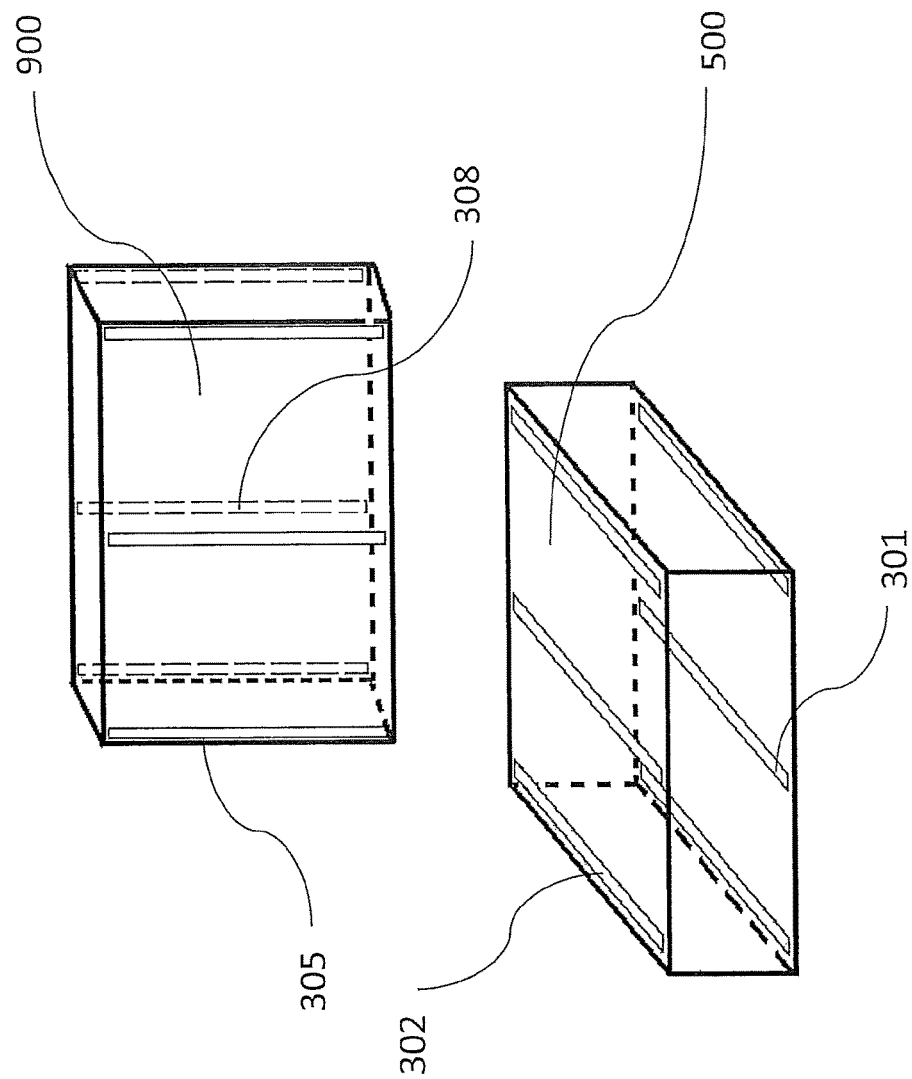
FIG. 2 shows a machine bed with cooling profiles and a post with cooling profiles according to an embodiment of the invention.

In FIG. 2, a post (900) and a machine bed (500) are illustrated. On the post (900), various cooling profiles are attached to the front side and backside, directly on the surface. Along the left front edge of the post (900), there is the fifth cooling profile (305). Parallel to this cooling profile, a further cooling profile is centrally disposed on the post on the front side. On the right outer side parallel to the fifth cooling profile (305) on the front side of the post (900), a further cooling profile is additionally disposed. On the backside of the post (900) too, three cooling profiles are disposed parallel to each other. Preferably, these cooling profiles may be disposed in areas in which the temperature of the concerned structural part of the machine tool assumes a maximum value or minimum value. Thus, the cooling profiles may be particularly disposed in the area of heat generating functional components.

On the machine bed (500), on the upper side, three parallel cooling profiles are disposed. Therein, on the left edge of the upper side of the machine bed (500), the second cooling profile (302) is disposed. Parallel to the second cooling profile (302), there is the third cooling profile centrally on the machine bed. Parallel to it, there is a further cooling profile on the right outer side following the edge extension. On the lower side of the machine bed (500), there are three cooling profiles. These cooling profiles are disposed parallel to each other and parallel to the outer edges of the machine bed (500). Heat generating functional components are usually disposed on the upper side on the machine bed (500), while heat generating functional components are not disposed on the lower side of the machine bed (500), such that the opposing arrangement of the cooling profiles on the upper side and the lower side of the machine bed (500), respectively, results in an ideal equalization of the temperature gradient in the machine bed (500). By the simple application of such cooling profiles on the surface and along the edges of the structural components of the machine tool, respectively, tempering of the structural components of the machine tool may be effected with simple means and thus a flow channel system can be simply formed. Thus, a uniform temperature distribution in the respective structural components is achieved by the mentioned implementation, and thereby the deflections of the structural components are reduced without requiring an expensive refrigerating machine therein. Thus, according to an embodiment of the present invention, the heat equalization within the structure can be increased via the described cooling profiles since the heat conduction in the structure via the material alone is too inert to prevent the described curvatures. Accordingly, embodiments of the present invention can be employed in all of the machine tools that are exposed to heat or cold influences and have inaccuracies due to this. Expensive cooling measures are not needed for the present invention.

In FIG. 3A, the exemplary arrangement of a cooling profile as a flow channel in the basic element (15) is illustrated. The cooling profile (300) is inserted in a milled recess in the basic element (15) and fixed to the basic element (15) via a fixing clamp (161). Preferably, the fixing clamp (161) is screwed to the basic element (15). In this embodiment, the cooling profile (300) was only presented as a simple pipe, wherein the employment of profiles with very different cross-sections is also possible.

In FIG. 3B, a cooling profile is stored in a fixing piece (162). The fixing piece (162) is preferably screwed to the basic element (15). The fixing piece (162) may additionally be welded to the basic element. This has the advantage that a particularly good contact between the fixing piece (162) and the basic element (15) is effected by welding and thereby the thermal transfer also turns out particularly advantageous.

In FIG. 3C, the cooling profile (300) is illustrated in a bore in the basic element (15). The arrangement of the cooling profile (300) in a bore is especially practicable in structural parts with narrow space conditions.

Figure 4:
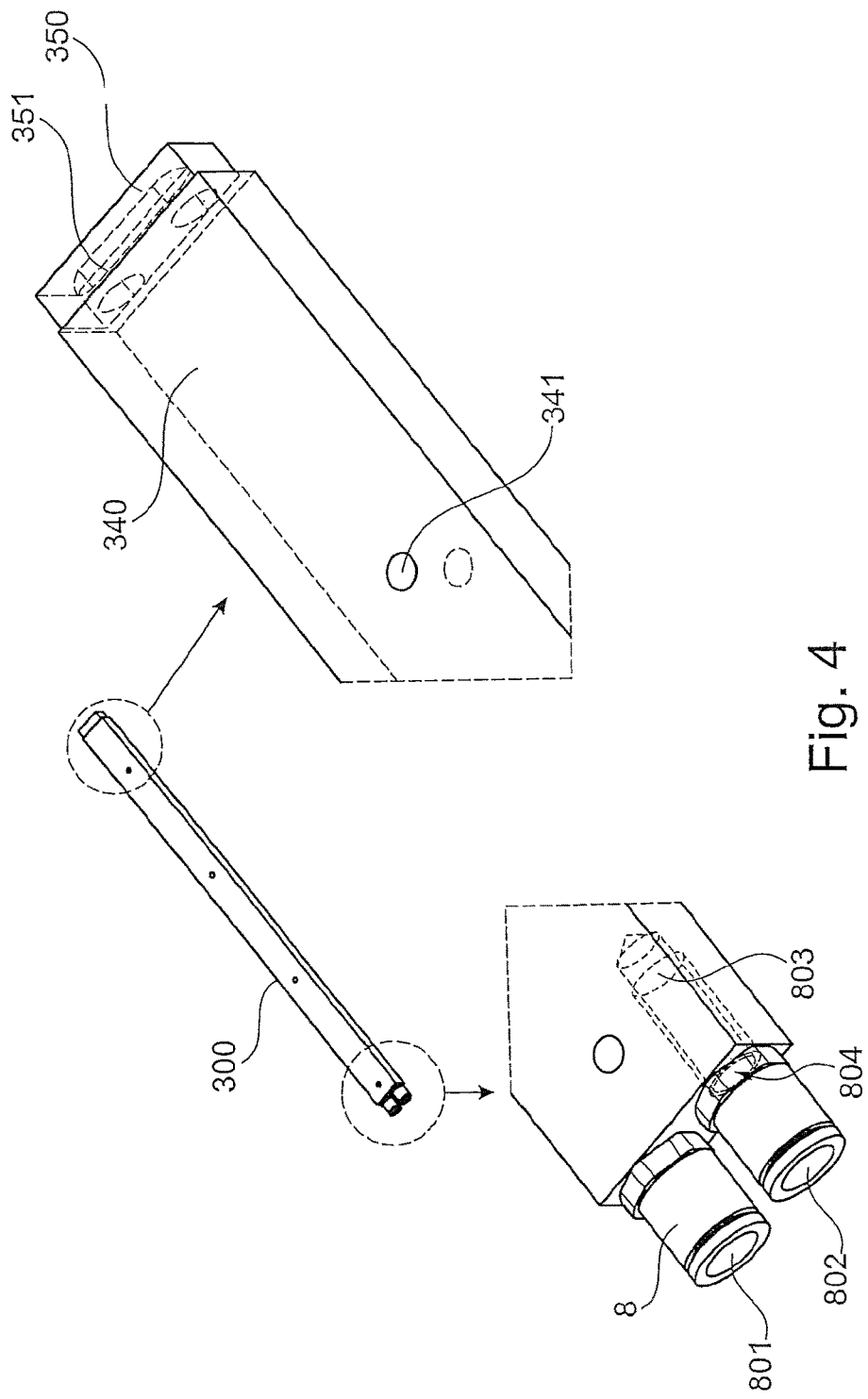
FIG. 4 shows a cooling profile with feed and return, and additionally a redirecting plate according to an embodiment of the invention.

In a particularly advantageous configuration of the flow channel system of the present invention, the cooling profile has not only a single flow channel, but two flow channels. In FIG. 4, a cooling profile (300) with a feed channel and a return channel and a connection side (8) is illustrated. In the illustrated cooling profile, the port for the feed (801) and the port for the return (802) are on the same side face of the cooling profile (300). This ensures a particularly simple configuration of the circulation circuit or flow channel system. The feed port (801) and the return port (802) are connected to the cooling profile via the joint (804) with the connection thread (803) (preferably G ¼ thread), wherein the various connections of the ports (801) and (802) to the profile are preferably screw-in connections. This ensures simple producibility and high reliability with respect to the tightness of the cooling profile. The illustrated cooling profile has the advantage that it can be very simply produced and additionally can be very easily produced by simple cut of the cooling profile (300) and subsequent screwing of the feed and return ports to the desired length. On the opposing side of the feed port (801) and return port (802), there is a redirecting plate (350). The redirecting plate (350) serves for redirecting the tempering medium from the feed into the return and vice versa, respectively. Therein, the redirecting plate (300) can e.g. be welded onto the cooling profile. The redirecting plate (350) has a redirecting cavity (351). This redirecting cavity is preferably a simple milled recess in the redirecting plate (350). The cooling profile (300) with the cooling profile surface (340) can be stably connected to the respective structural part of the machine tool via fixing bores (341) in simple manner. Thus, exchangeability of the individual cooling profiles of the flow channel system of the machine tool e.g. in case of occurrence of signs of wear is also possible. With the aid of the shown cooling profiles, a very simple and inexpensive formation of a flow channel system/circulation circuit is possible. Thus, already by employment of only few cooling profiles on the warm and cool sides of the machine tool, simple tempering of the machine tool can occur.

Figure 5:
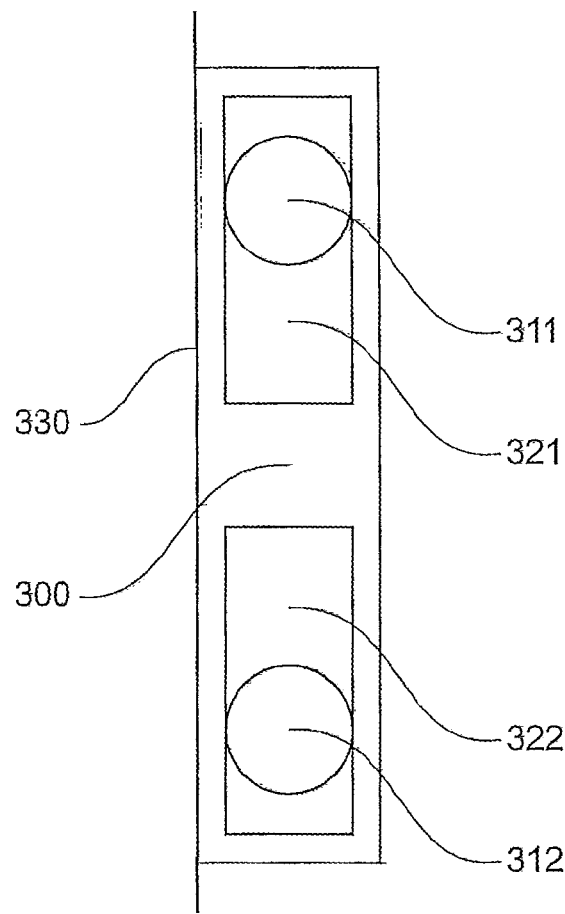
FIG. 5 shows the cross-section of a cooling profile with feed and return according to an embodiment of the invention.

The cross-section of a cooling profile of the flow channel system is exemplarily illustrated in FIG. 5. The illustrated cooling profile (300) is configured as a rectangular hollow profile with two separated chambers. The cooling profile has a first cavity (311) and a second cavity (312). The first cavity (311) is enclosed by the first cavity enclosure (321). The second cavity (312) is enclosed by the second cavity enclosure (322). On the left side, there is the fixing side (330) of the cooling profile (300). The first and second cavity enclosures can directly be configured as a cavity or be formed of a material with very high thermal conductivity. If the cavity enclosures are configured as actual cavities, thus, the shown cooling profile (300) actually includes two rectangular large chambers which are connected to the flow channel system via the feed and return ports. Since the cavities can receive a particularly large amount of the tempering medium therein, the respective structural part of the machine tool can also be particularly effectively tempered.

Figure 6:
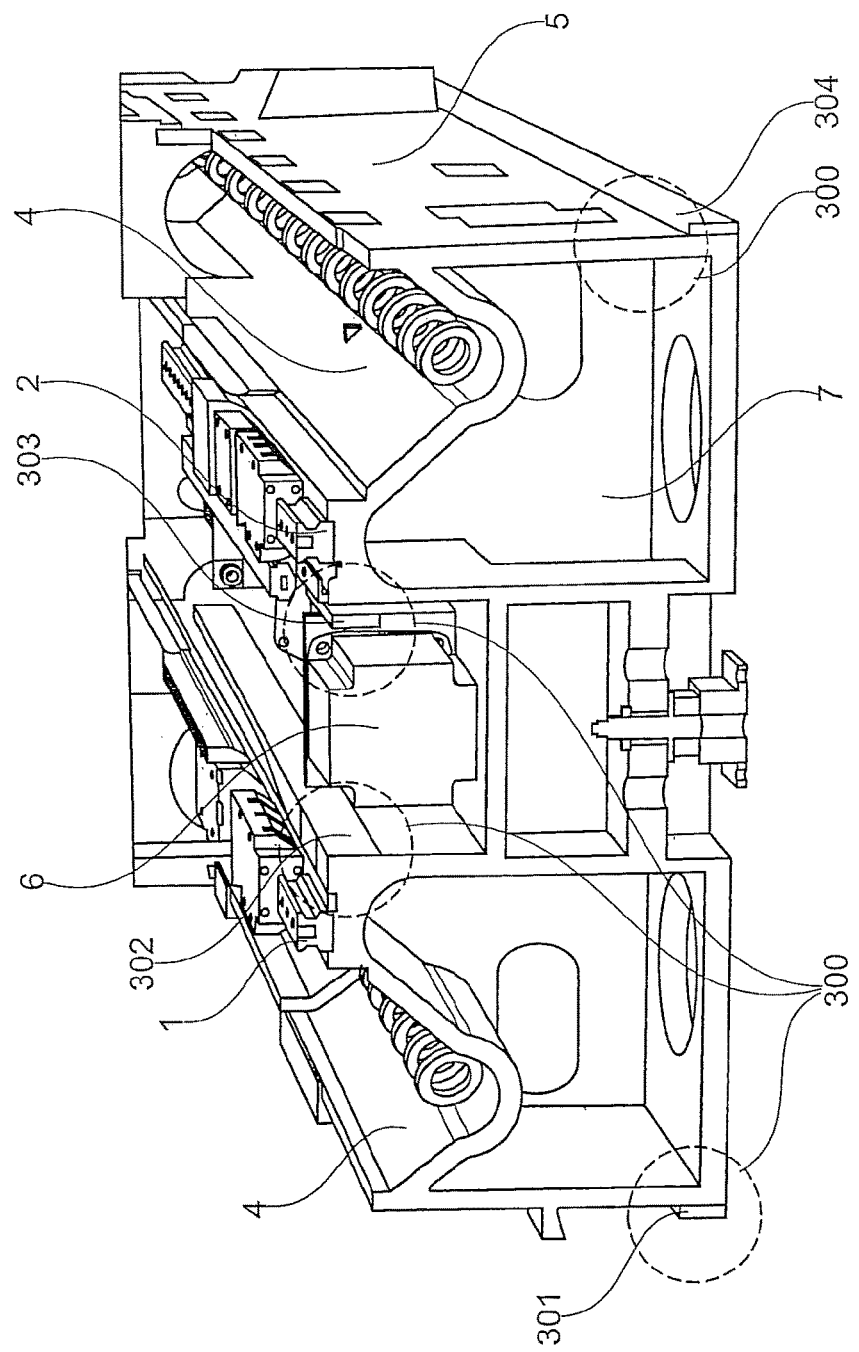
FIG. 6 shows a machine bed with cooling profiles on the upper side and lower side of the machine bed according to an embodiment of the invention.

In FIG. 6, a machine bed with multiple cooling profiles (300) of the flow channel system is illustrated. Therein, on the lower side of the machine bed, there is the first cooling profile (301) and the fourth cooling profile (304). These two cooling profiles are thus not on the heated or cold side of the machine bed. In these cooling profiles, thus, the tempering medium is cooled or heat is dissipated. On the upper side of the machine bed, there are the second cooling profile (302) and the third cooling profile (303) which are directly disposed on heat generating functional components. In particular, the second cooling profile (302) and the third cooling profile (303) are disposed on the first guide (1) and on the second guide (2). In the center of the machine bed, additionally, heat generating drives (6) can be located. The second cooling profile (302) and the third cooling profile (303) absorb the input heat of the heat generating functional components via the tempering medium circulating therein and transport it into cooling profiles in colder areas of the machine bed or of the machine tool. The machine tool and in particular the illustrated machine tool bed has a bed flush (4) and hollow chambers (7). The arrangement of the various cooling profiles illustrated in FIG. 6 results in particularly effective tempering and thus in a particularly effective heat equalization or a particularly effective heat distribution in the machine bed since the profiles are disposed particularly close to the heat generating functional components and the profiles provided for the heat equalization are disposed in particularly cold areas of the machine rack. In addition, the illustrated arrangement of the cooling profiles can be particularly inexpensively manufactured since only the four hollow profiles have to be attached to the machine tool or the machine tool bed to sufficiently or effectively temper it.

Figure 7:
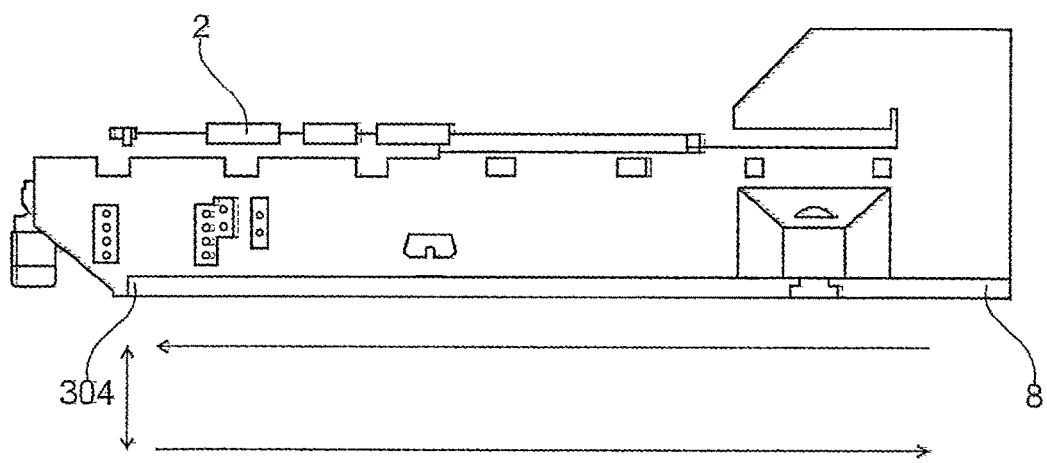
FIG. 7 shows a side view of the machine bed and the schematic progress of the tempering medium within a circulating circuit or flow channel system according to an embodiment of the invention.

For further explanation of the machine tool illustrated in FIG. 6 or the illustrated machine tool bed, a side view of the machine tool bed is illustrated in FIG. 7. Via the fourth cooling profile (304) illustrated in FIG. 7 on the lower side of the machine bed, a part of the flow channel system is illustrated. In particular, in FIG. 7, a schematic circulation of the tempering medium within the flow channel system or the cooling profile is illustrated with the arrows below the machine bed. On the right outer side of the fourth cooling profile (304), there is the cooling profile port (8). The tempering medium is directed following the schematic flow arrows from the cooling profile port 8 towards the left outer end of the machine bed and back.

Figure 8:
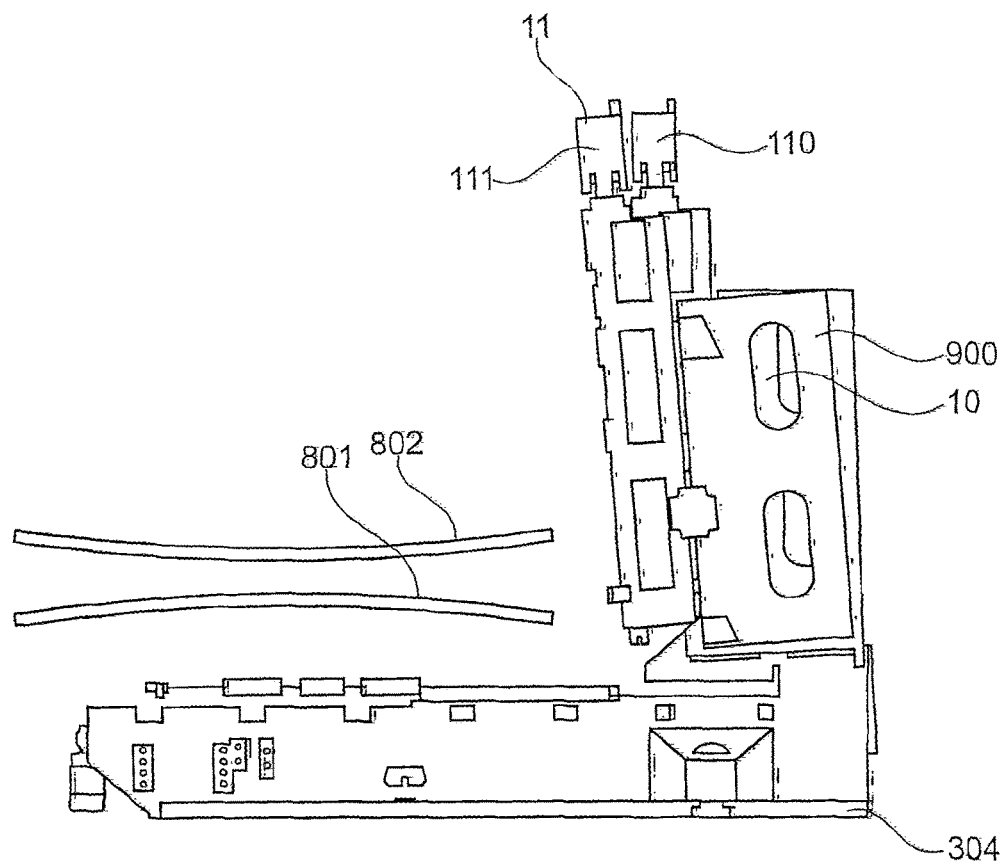
FIG. 8 shows a machine tool in an initial state and in a deformed state, wherein the post curves towards machine bed in the deformed state, according to an embodiment of the invention.

In FIG. 8, a cooled and uncooled machine tool is illustrated in comparison. Therein, the illustrated machine tool includes a post (900) with post recesses (10). On the lower side of the machine bed, a fourth cooling profile (304) and on the upper side of the post (900) the upper drive (11) is illustrated. The initial position of the upper drive (110) shows a considerable deviation compared to the deformation position of the upper drive (111). Via the schematic lines (801) and (802), additionally, the deformation of the machine bed is again to be illustrated. The deformations of the machine tool illustrated in FIG. 8 are shown enlarged. However, it is to be noted that a considerable improvement (reduction) of the deflection and curvature of the machine tool can be ascertained by the arrangement according to the invention of the cooling profiles according to the invention on the various areas of the machine tool.

Figure 9:
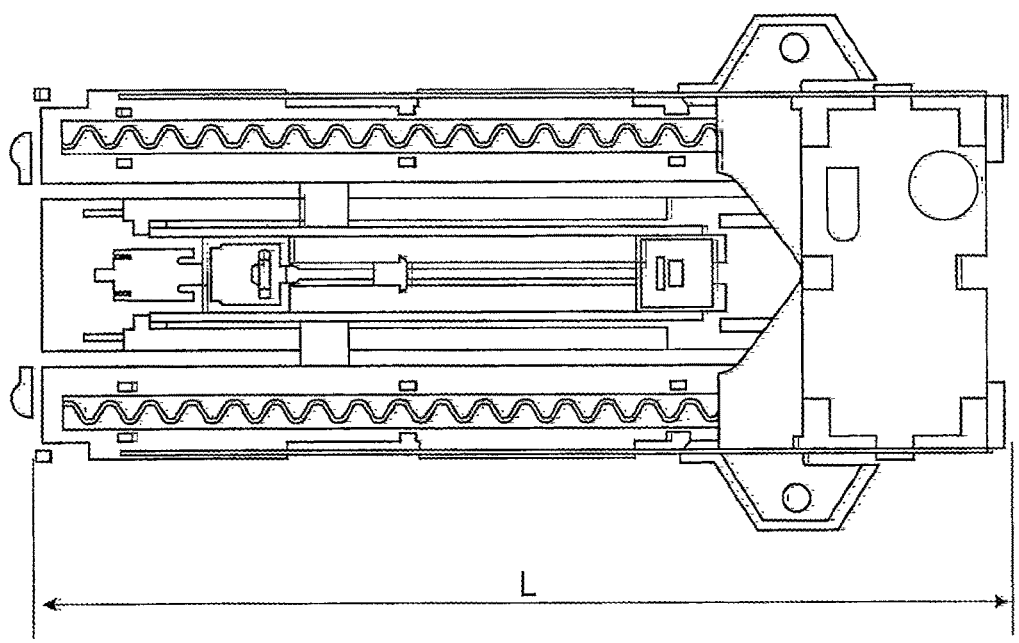
FIG. 9 shows a plan view of a machine bed with an overall length L according to an embodiment of the invention.

In FIG. 9, the plan view of the machine bed is illustrated. In particular in machine tools with a very long machine bed, the curvatures of the machine bed particularly severely affect the processing accuracy of the workpieces. In FIG. 9, the length of the machine tool or the length of the machine tool bed is denoted by L.

Figure 10A:
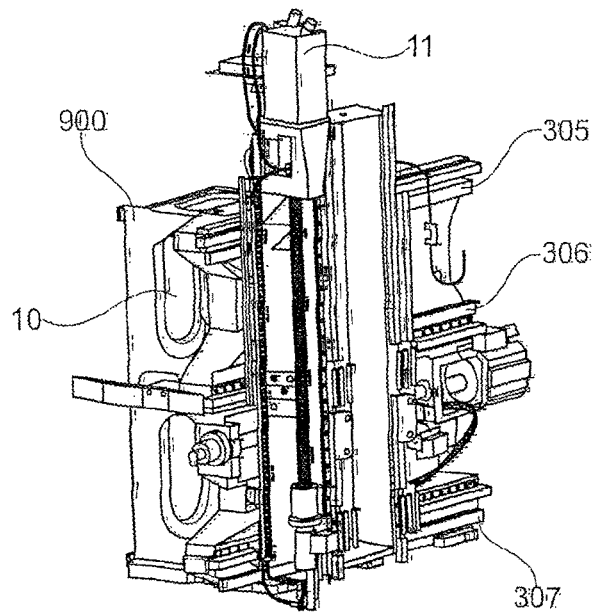
FIG. 10A shows a front view of a post with various cooling profiles according to an embodiment of the invention.
Figure 10B:
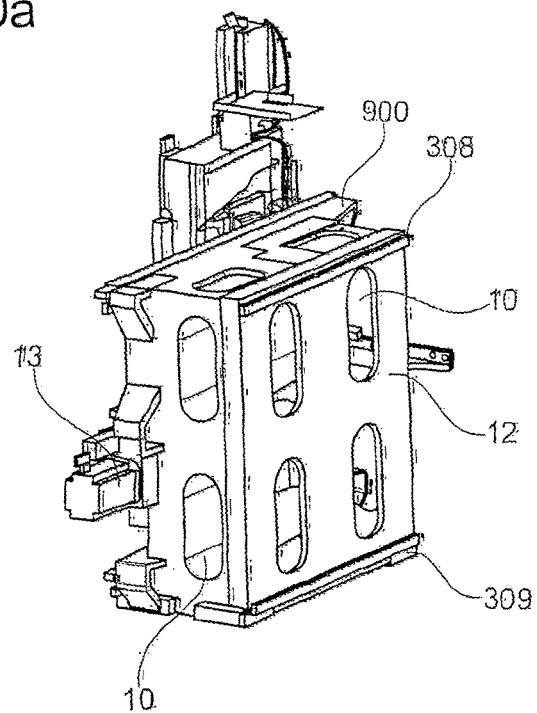
FIG. 10B shows a rear view of a machine post with various cooling profiles according to an embodiment of the invention.

Analogously to the arrangements of the cooling profiles on the various sides of the post (900) in FIG. 2, in FIGS. 10A and 10B, preferred arrangements of the cooling profiles on the post of the machine tool are illustrated in a specific example. In FIG. 10A, a fifth cooling profile (305) is disposed along an upper edge of the post (900). Along an axis of the post (900), a sixth cooling profile (306) is centrally disposed. On the lower side of the post (900), a seventh cooling profile (307) is disposed. By the illustrated arrangement of the cooling profiles, equalization of the heat development on the central drive (13) from the sixth cooling profile (306) towards the fifth and seventh profiles of the post can occur. In FIG. 10B, the rear view (12) of the post (900) of the machine tool is illustrated. Therein, the post (900) has an eighth cooling profile (308) on its upper side and a ninth cooling profile (309) on its lower side.

For further explanation of the invention and the special arrangement of the various cooling profiles, the flow channel system of the machine tool according to embodiments of the invention can also be regarded as a tempering device for tempering the machine tool. Therein, various channels (first and second flow channels) of the flow channel system, in which the tempering medium is circulated, are disposed in first and second areas of the machine tool. In the first areas, therein, heat sources are disposed and the second areas are spaced from the first areas. The heat input into the second areas generated by the heat sources can be lower than into the first areas. The first flow channels can be disposed in the first areas and the second flow channels can be disposed in the second areas. The flow channels can additionally be disposed along the edges and/or on the surfaces of the structural parts of the machine tool. The flow channels can be disposed on the structural parts of the machine tool such that upon circulating the tempering medium from the first flow channels into the second channels, the temperature gradient of the different areas of the machine tool can be decreased. By the arrangement of the flow channels in the various areas of the machine tool, redistribution of the heat input into the structure of the machine tool can be effected in simple manner.

In FIG. 11, exemplary dimensions for a particularly advantageous configuration of the cooling profile or cross-section of the cooling pro-file are illustrated. For this hollow profile, therein, in particular a material with very high thermal conductivity is preferred.

Figure 12:
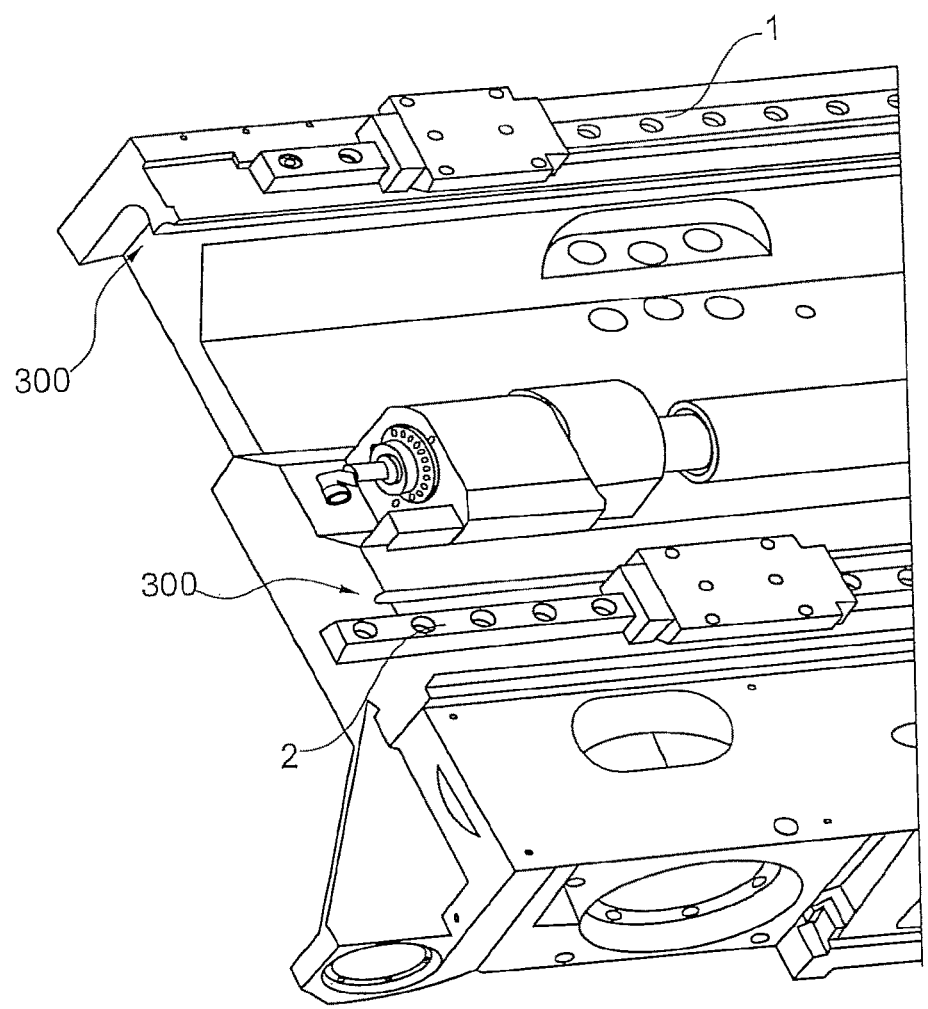
FIG. 12 shows a structural component of a machine tool, wherein the cooling profiles are disposed in grooves along the guides, according to an embodiment of the invention.

In order to be able to further increase the heat dissipation in particular in the guides, it is advantageous to accommodate the cooling profiles in grooves which are directly disposed next to the guide. In FIG. 12, cooling profiles are illustrated in grooves which are directly disposed next to the guide (1) and the guide (2). Thus, by the arrangement of the cooling profiles (300) shown in FIG. 12, heat dissipation is optimally allowed directly at the guides (1) and (2) such that the deformations and deflections or the curvatures of the structural part of the machine tool can be minimized. The fixing possibilities preferred for fixing and attaching the cooling profiles in the grooves or milled recesses are shown in FIGS. 13A to 13C.

In FIG. 13A, a cooling profile (300) is shown which is disposed in a milled recess (groove 151) in the basic element (15) of the structural part of the machine tool. The cooling profile (300) is pressed into the milled recess via a fixing lid (16) such that optimum contact of the cooling profile with the basic element is ensured and such that the heat transfer is maximized. This is ensured, e.g., via the illustrated fixing lid (16) which is pressed onto the cooling element (300) and deforms such that the fixing lid (16) engages with the fixing grooves on the basic element on the one hand and adapts to the surface of the cooling profile (300) on the other hand.

In FIG. 13B, a cooling profile (300) is illustrated which is pressed into a milled recess in the basic element (15).

In FIG. 13C, the milled recess (151) in the basic element (15) is configured such that the cooling profile (300) can be pressed into the milled recess of the basic element such that it is fixed in the wedge-shaped part of the milled recess in the basic element (15). Thus, in the installation of the cooling profile (300), here, it is guided slightly compressed through the neck of the milled recess in the basic element (15) such that the cooling profile can again expand in the bulbous element of the milled recess and does no longer slip through the neck of the milled recess of the basic element (15) by itself. By providing wedge-shaped milled recesses for fixing the cooling profile (300), a particularly beneficial form of fixation of the cooling profile can be provided.

Figure 14:
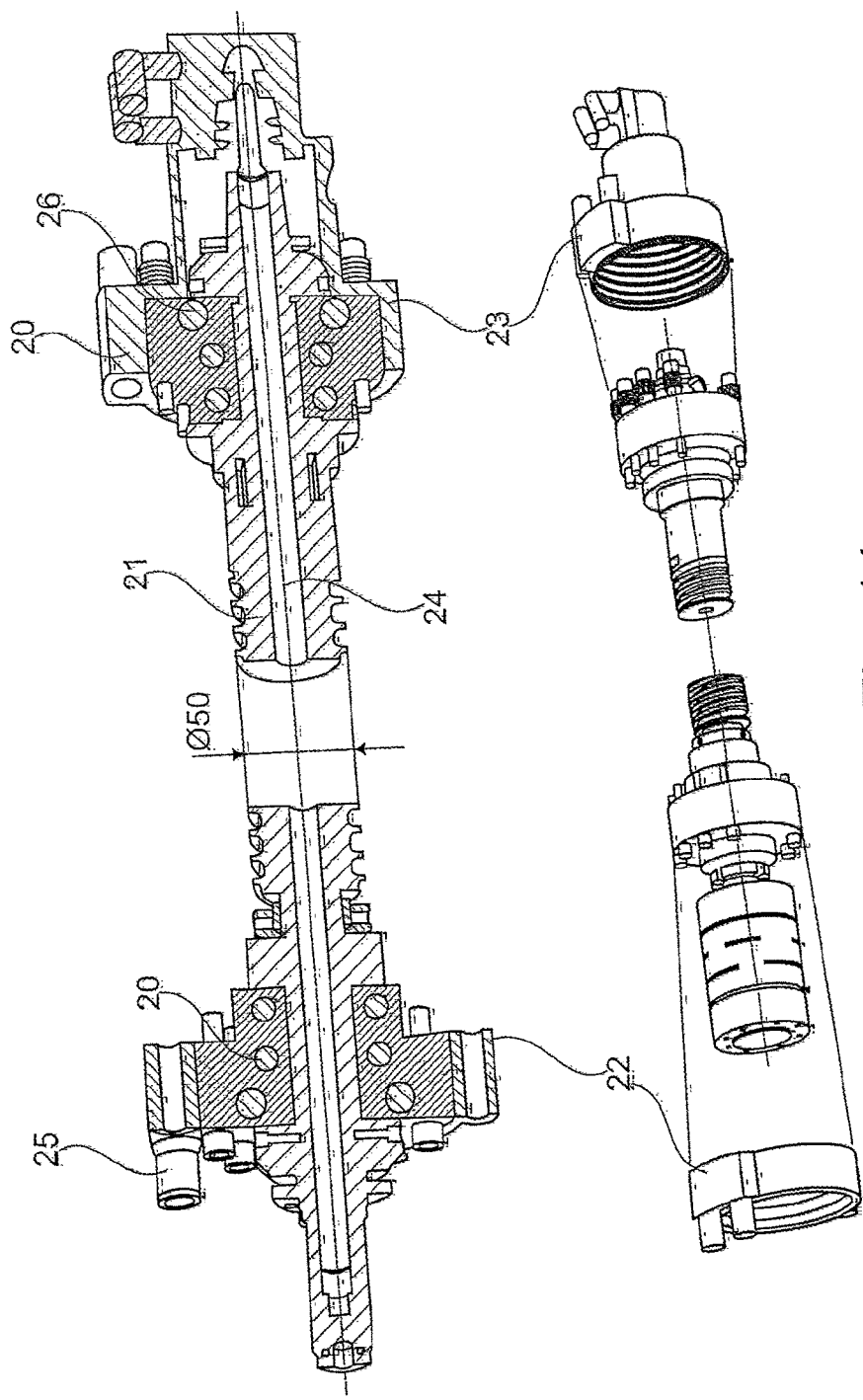
FIG. 14 shows the tempering of the bearings and the core of a spindle according to an embodiment of the invention.

In FIG. 14, a spindle core cooling combined with a spindle bearing cooling is illustrated. In order to further increase the temperature stability of the machine tool, in addition to the spindle core cooling, a spindle bearing cooling can be provided. Therein, the spindle bearing cooling is realized via the second cooling bores (25) and the third cooling bores (26). Therein, the second cooling bores (25) are on a cooling ring (22) which is applied to the bearing (20). The third cooling bores (26) are in a cooling pot (23) which is attached to the front side of the spindle. Thus, in the illustrated embodiment, not only the core 21 of the spindle is cooled via the first cooling bore (24), but the bearings on the outer sides are additionally cooled or tempered via the second cooling bore (25) and the third cooling bore (26) and thus higher temperature stability and higher precision of the machine tool are achieved. The cooling ring (22) has multiple cooling bores in its interior, through which the tempering medium is circulated and with the aid of which the temperature of the bearing (20) can be stably maintained.

Figure 15:
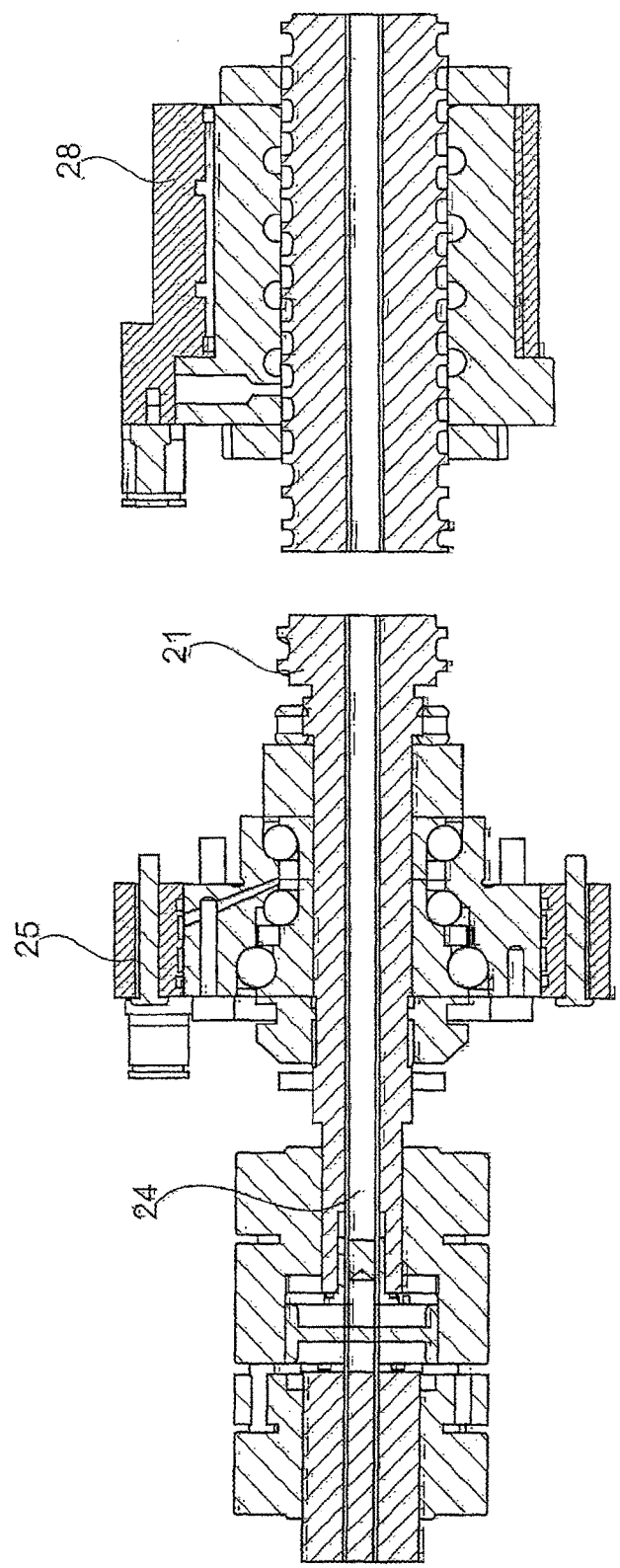
FIG. 15 shows a bearing cooling and a nut cooling of the spindle according to an embodiment of the invention.

In FIG. 15, a cross-section through the spindle assembly is again illustrated. In FIG. 15, a nut cooling is additionally exemplarily illustrated. Therein, on the outer circumference of the nut, an additional second cooling ring with various cooling bores is attached. Thus, besides the first cooling bore (24), temperature stabilization of the spindle is also achieved via the second cooling bores (25) and via the cooling bores in the second cooling ring (28).

Figure 16:
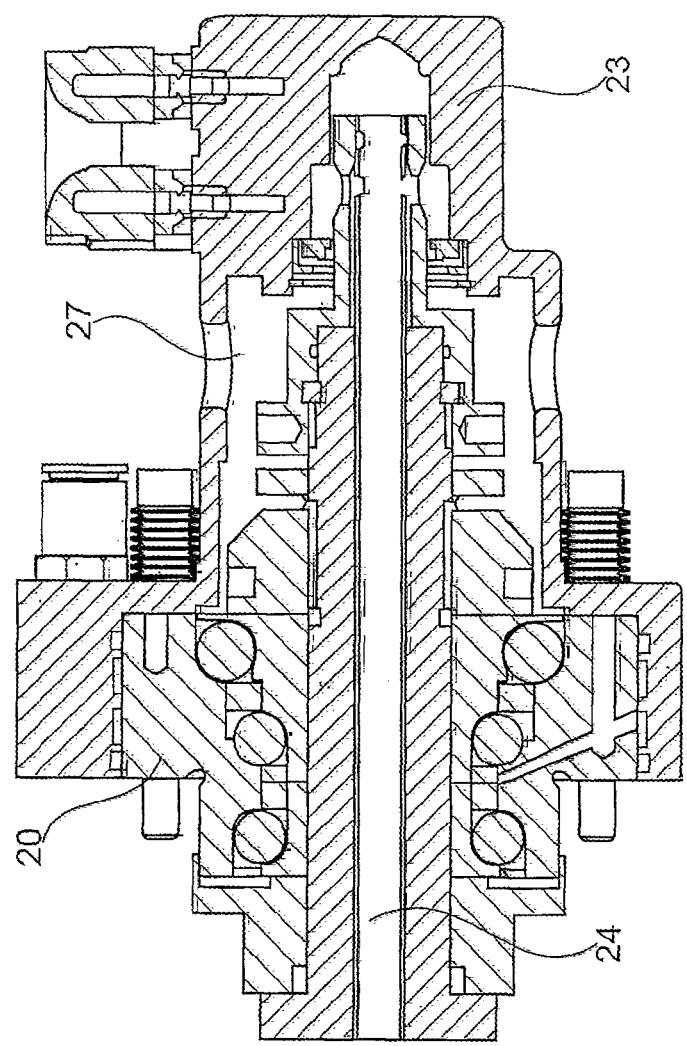
FIG. 16 shows a bearing and spindle core cooling according to an embodiment of the invention.
Figure 17:
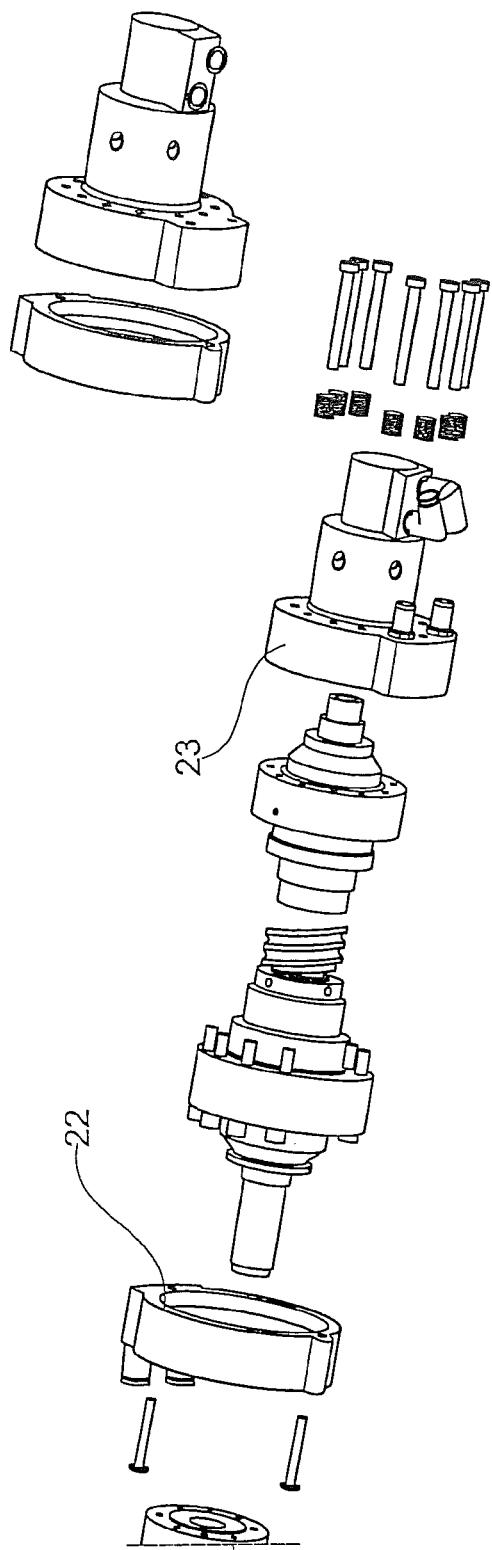
FIG. 17 shows a cooling ring and a cooling pot for tempering an advancing drive of a machine tool according to an embodiment of the invention.

In FIG. 16, a combined bearing and spindle cooling is again illustrated. Therein, via a cooling pot (23) combined with a cooling ring which is disposed around the outer circumference of the illustrated bearing, and via cooling channels of the flow channel system provided therein, tempering of the bearing on the one hand and of the spindle core (21) on the other hand is effected. By tempering the spindle core (21) and at the same time also of the bearings (20) of the spindle, the precision of the machine tool can be particularly increased. For exemplifying, the cooling ring (22) and the cooling pot (23) of the previously mentioned tempering on the spindle are again illustrated. Therein, the cooling ring (22) and the cooling pot (23) are fixed to each other via screws. A configuration is particularly preferred, in which the cooling ring (22) as well as the cooling pot (23) are manufactured from cast aluminum since thereby a particularly high temperature stabilization of the tool spindle can be achieved. In addition, the weight of the spindle is only minimally increased by the cast aluminum.

Figure 18:
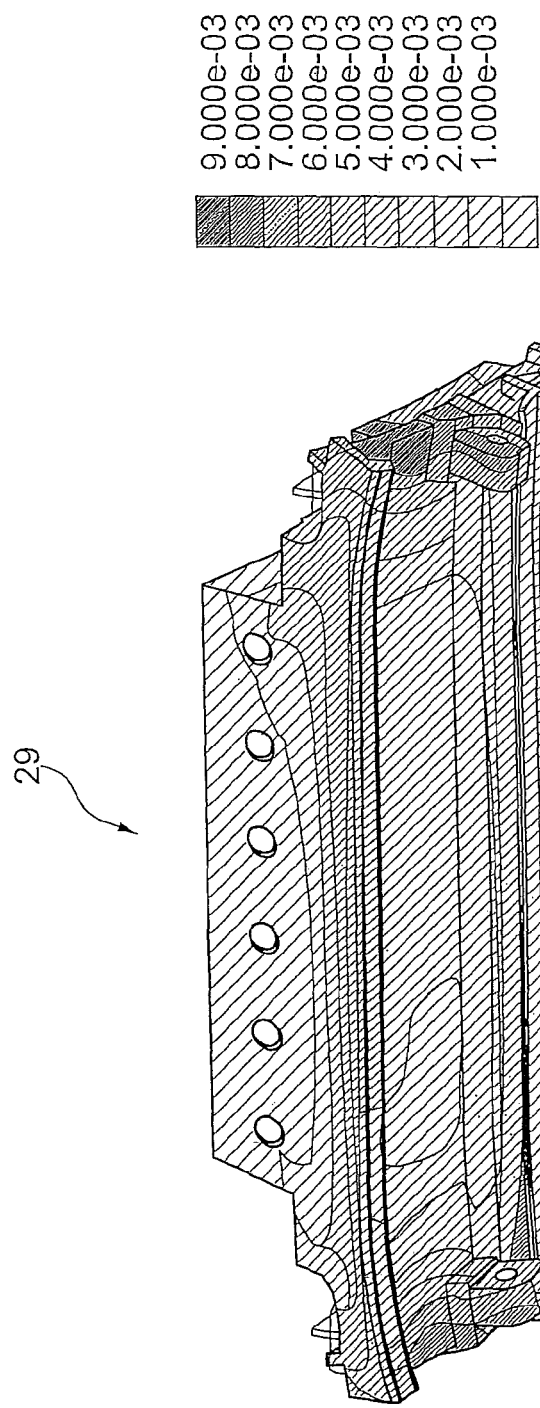
FIG. 18 shows the displacement of the cooled cross-beam in millimeters according to an embodiment of the invention.

In FIG. 18, the displacement of the cooled cross-beam (29) is illustrated in millimeters. By the additional cooling at the guides of the cross-beam, the bend of the cross-beam can be considerably reduced from 12 µm to 2 µm with reference guide. The bend in the non-cooled state has a portion of about 30% on the overall displacement. The other 60% can be explained as follows: expansion of the x-slide by heating of the ball screw spindle nut; expansion of the cross-beam in the width (y-direction of the machine); temperature differences of the cross-beam in z-direction, thereby rotation around the x-axis and displacement in y-direction.

In a particularly advantageous configuration according to an embodiment of the present invention, a required internal diameter of only 9 mm results for the pipes of the flow channel system to achieve the required cooling power in the cross-beam (29). Therein, the required volume flow is at 6 l/min., wherein the optimum feed temperature is at 23° C. With these boundary conditions, the deformations of the machine tool can be considerably reduced.

Figure 19:
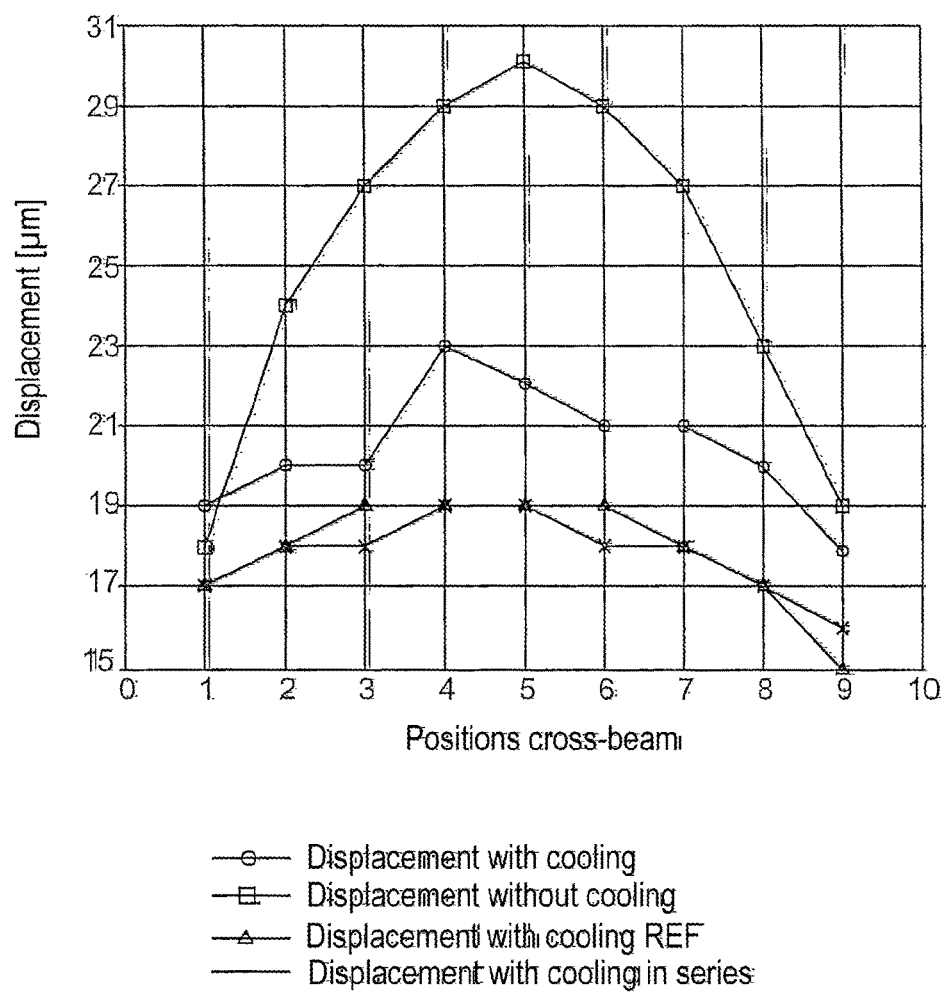
FIG. 19 shows a comparison of the maximum displacements on the cross-beam with and without tempering according to an embodiment of the invention.

In FIG. 19, the comparison of the maximum displacements on the cross-beam (29) is again illustrated in a summarizing manner. Therein, the difference between the displacements with cooling and the dis-placements without cooling is clearly seen. The displacements are presented depending on the position on the cross-beam in FIG. 19. The displacement itself is presented in micrometers in FIG. 19.

Figure 20:
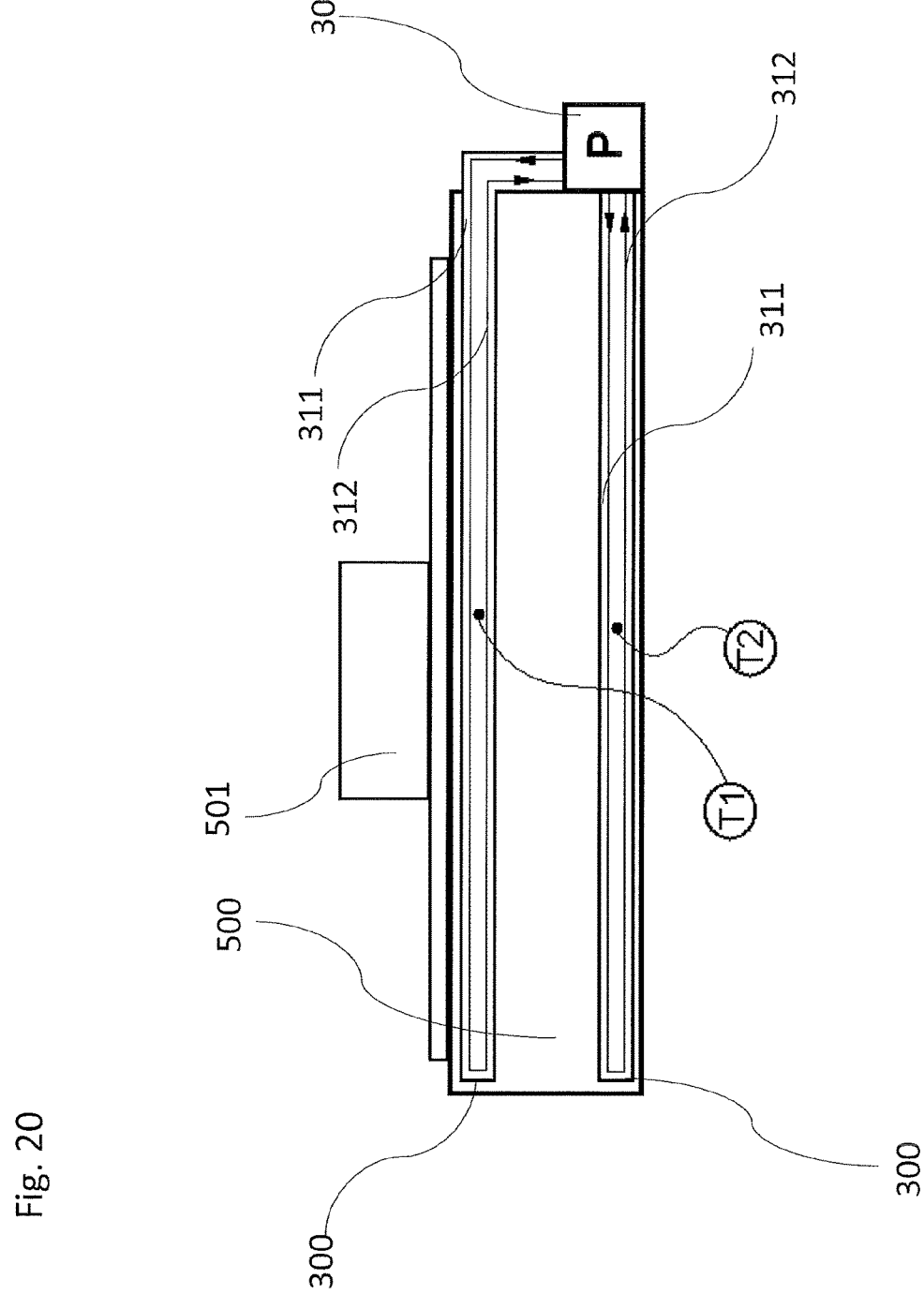
FIG. 20 shows a closed loop for regulating the volume flow of the tempering medium according to an embodiment of the invention.

FIG. 20 shows a simplified closed loop for regulating the volume flow of the tempering medium in the flow channel system (301-309) on the example of a machine bed (500). In simplified manner, the flow channel system is composed of two cooling profiles (300), each having a feed (311) and a return (312). The ports of the cooling profiles (300) are passed to a pump (30). The tempering medium is circulated in the flow channel system with the aid of the pump (30). Thus, the volume flow of the tempering medium can be adjusted via the power of the pump (30). Depending on the respective machine tool or the considered component and the heat generating functional components present there and the installed cooling profiles, the volume flow in the flow channel system can be regulated such that a certain differential temperature is not exceeded within the various areas or sections of the flow channel system. Therein, the available cross-section for guiding the tempering medium in the flow channels in particular plays an important role. A further factor is the occurring heat input of the functional components into the structure of the machine tool. Depending on these factors, the pump can be selected such that via the regulation of the pumping power, the volume flow is always adjusted such that the amount of the differential temperature of the tempering medium does not exceed a value of 3° C., and particularly advantageously 1° C. Thereby, it is possible to limit the deformations and in particular the curvatures and deflections of the machine tool structure such that an optimum ratio between tempering effort and component processing accuracy can be achieved. For regulating the volume flow, in addition, temperatures are measured on the upper side and the lower side of the machine bed (500). Therein, the measurement points of the temperature T1 and T2 are preferably provided in the areas of the occurring maximum temperatures, each on the upper side and lower side (cold and warm side of the respective structure). The heat generating functional components are illustrated exemplarily in FIG. 20 based on the machine table (501).

Present features, components and specific details may be exchanged and/or combined to create further embodiments depending on the required purpose of use. Possible modifications, which are within the scope of the knowledge of the man skilled in the art, are disclosed implicitly with the present description.

What is claimed is:

1. A machine tool comprising:
   a machine rack constructed of structural parts that have components mounted thereon, wherein the components include functional components configured to generate heat during operation of the machine tool which is input into the structural parts and/or the components by heat transport; and
   a flow channel system having first and second flow channels:
      wherein the flow channel system is disposed in first areas and second areas spaced from the first areas on the structural parts and/or the components of the machine tool wherein a heat input into the second areas generated by the functional components is less than a heat input into the first areas and a liquid is circulated in the flow channel system such that the heat generated by the functional components is distributed in the machine rack and/or the components as a result of passage of the liquid so as to equalize the temperature gradient in the machine tool exclusively by circulating the liquid in the flow channel system, and
      wherein the flow channels of the flow channel system are hollow profiles and said hollow profiles are disposed directly on a surface of the components of the machine tool.

2. The machine tool according to claim 1, wherein the flow channel system is disposed on the structural parts and/or the components of the machine tool such that tilts and/or displacements of the structural parts and/or the components are prevented.

3. The machine tool according to claim 1, wherein the flow channel system comprises flow channels that are configured as cooling profiles and the cooling profile includes at least a feed channel and a return channel for receiving the liquid.

4. The machine tool according to claim 3, wherein the feed channel is connected to the return channel in a conducting manner such that the liquid is redirected.

5. The machine tool according to claim 3, wherein the feed channel is connected to the return channel via a plate welded to the cooling profile, the plate having a milled track for redirecting the feed into the return.

6. The machine tool according to claim 3, wherein the cooling profiles are fixed onto the components of the machine tool with screws.

7. The machine tool according to claim 1, wherein the flow channel system comprises flow channels that are configured as pipes, the pipes being fixed in grooves of the machine tool.

8. The machine tool according to claim 7, wherein the pipes are fixed in the grooves via fixing lids.

9. The machine tool according to claim 7, wherein the pipes of the flow channels are made of copper.

10. The machine tool according to claim 1, wherein the flow channel system comprises flow channels that are bores in the components and/or the structural parts of the machine tool.

11. The machine tool according to claim 1, wherein the flow channel system comprises flow channels that are disposed in a spindle core and in a spindle bearing.

12. The machine tool according to claim 1, the machine tool further comprising a machine bed and a machine post, and the flow channel system comprising flow channels that are disposed on an upper side and a lower side along edges of the machine bed and on an upper side and a lower side along edges of the post.

13. The machine tool according to claim 1, wherein a pump for regulating a volume flow of the liquid is set such that a differential temperature of the liquid in various areas of the flow channel system is limited to no more than 3° C.

14. The machine tool according to claim 1, further comprising a first temperature sensor and at least one second temperature sensor for sensing a temperature gradient, the first temperature sensor being provided in an area of the functional components and the at least one second temperature sensor being provided in an area without functional components on the machine tool.

15. The machine tool according to claim 14, further comprising a regulation and control unit that is set such that a volume flow of the liquid is regulated via power of a pump such that a differential temperature between the first and the second temperature sensor is limited to no more than 3° C.

16. The machine tool according to claim 1, wherein the hollow profiles are rectangular hollow profiles which are separate parts from the components of the maching tool.

17. The machine tool according to claim 1, wherein a pump is provided for regulating a volume flow of the liquid in the flow channels such that a differential temperature of the liquid in various areas of the flow channel system is no more than a predetermined temperature, without using a refrigerating machine.

18. The machine tool according to claim 1, wherein the hollow profiles are attached to an outer surface of the components of the machine tool.

19. A method for tempering the machine tool according to claim 1, comprising:
    equalizing the temperature gradient in the machine tool exclusively by circulating a liquid in the flow channel system.

20. The method for tempering a machine tool according to claim 19, further comprising regulating a volume flow of the liquid in the flow channels via a pump such that a differential temperature of the liquid in various areas of the flow channel system is no more than 3° C.

* * * * *